United States Patent
Li et al.

(10) Patent No.: US 12,486,888 B2
(45) Date of Patent: Dec. 2, 2025

(54) GEARBOX STRUCTURE FOR DRIVING

(71) Applicant: GUANGDONG YONGDING TECHNOLOGY CO., LTD., Guangdong (CN)

(72) Inventors: Zheng Li, Guangdong (CN); Jingke Wang, Guangdong (CN)

(73) Assignee: GUANGDONG YONGDING TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/580,731

(22) PCT Filed: Sep. 15, 2022

(86) PCT No.: PCT/CN2022/118912
§ 371 (c)(1),
(2) Date: Jan. 19, 2024

(87) PCT Pub. No.: WO2023/040930
PCT Pub. Date: Mar. 23, 2023

(65) Prior Publication Data
US 2024/0344597 A1    Oct. 17, 2024

(30) Foreign Application Priority Data

Sep. 16, 2021  (CN) .......................... 202122251948.2

(51) Int. Cl.
*F16H 19/08*    (2006.01)
*E05B 47/00*    (2006.01)
(Continued)

(52) U.S. Cl.
CPC ......... *F16H 19/08* (2013.01); *E05B 47/0012* (2013.01); *F16H 57/021* (2013.01);
(Continued)

(58) Field of Classification Search
CPC ...... F16H 19/08; F16H 57/021; F16H 57/039; F16H 2057/02034; F16H 2057/02073;
(Continued)

(56) References Cited

U.S. PATENT DOCUMENTS

2009/0173114 A1   7/2009   Lin et al.
2019/0383061 A1  12/2019   Shen et al.
2021/0062547 A1*  3/2021   Chen .................. E05B 9/02

FOREIGN PATENT DOCUMENTS

CN      108798277 A    11/2018
CN      110485821 A    11/2019
(Continued)

OTHER PUBLICATIONS

International Search Report dated Nov. 29, 2022 for International Application No. PCT/CN2022/118912 which is the family application of the instant application.

*Primary Examiner* — T. Scott Fix
(74) *Attorney, Agent, or Firm* — ScienBiziP, P.C.

(57) ABSTRACT

The gear box structure for driving includes a box body includes an upper housing and a lower housing, and an inner bottom surface of the lower housing is provided with a convex shaft, a first shaft hole penetrates vertically and is disposed at an axis of the convex shaft, and a second shaft hole is disposed in an upper end surface of the upper housing and the second shaft hole is coaxial with the first shaft hole, a driving member and a driven member are both sleeved on the convex shaft, the driving member can drive the driven member to rotate around the convex shaft, and a limiting component is disposed between the driven member and the upper housing, and is configured for limit the rotation angle of the driven member. The gear box structure has the advantages of simple and reasonable structure, convenient assembly, and good stability.

14 Claims, 7 Drawing Sheets

(51) Int. Cl.
    *F16H 57/02*     (2012.01)
    *F16H 57/021*     (2012.01)
    *F16H 57/039*     (2012.01)
    *G05G 1/08*     (2006.01)

(52) U.S. Cl.
    CPC ............. *F16H 57/039* (2013.01); *G05G 1/08* (2013.01); *E05B 2047/0017* (2013.01); *E05B 2047/002* (2013.01); *F16H 2057/02034* (2013.01); *F16H 2057/02073* (2013.01)

(58) Field of Classification Search
    CPC ......... E05B 47/0012; E05B 2047/0017; E05B 2047/002; G05G 1/08
    USPC ....................................................... 74/89.16
    See application file for complete search history.

(56) References Cited

FOREIGN PATENT DOCUMENTS

| | | |
|---|---|---|
| CN | 211201443 U | 8/2020 |
| CN | 211287049 U | 8/2020 |
| CN | 211776589 U | 10/2020 |
| CN | 211900106 U | 11/2020 |
| CN | 215806055 U | 2/2022 |
| CN | 215806195 U | 2/2022 |
| KR | 101008980 B1 | 1/2011 |

\* cited by examiner

GEARBOX STRUCTURE FOR DRIVING

TECHNICAL FIELD

The present disclosure relates to a gearbox structure for driving.

BACKGROUND

With the advancement of technology and society, more people are using smart door locks at homes. Smart door locks are reverse locked by electrically driving a reverse locking knob.

SUMMARY OF DISCLOSURE

Technical Background

Existing smart door locks generally require multiple parts to be installed one by one into the lock body during assembly. In this assembly manner, because different lock bodies may have different installation positions, installation efficiency may be severely reduced, and production costs may be high as a result.

Therefore, there is an urgent need for a gearbox structure for driving to solve this problem.

Solution to Problem

Technical Solution

Present disclosure provides a gear box structure for driving.

A gear box structure for driving designed according to this purpose includes a box body comprising an upper housing and a lower housing, wherein an inner bottom surface of the lower housing is provided with a convex shaft, a first shaft hole penetrates vertically and is disposed at an axis of the convex shaft, and a second shaft hole is disposed in an upper end surface of the upper housing and the second shaft hole is coaxial with the first shaft hole.

A driving member and a driven member are both sleeved on the convex shaft, the driving member drives the driven member to rotate around the convex shaft, and a limiting component is disposed between the driven member and the upper housing and is configured for limiting a rotation angle of the driven member.

Preferably, the upper end surface of the driving member is provided with an arc-shaped track groove, and the lower end surface of the driven member is provided with a linkage block, and the linkage block is downward and inserted into the arc-shaped track groove.

Preferably, two limiting blocks are disposed on the inner top surface of the upper housing with the center of the second shaft hole as the axis, an outer surface of the driven member is provided with a first protrusion, and the first protrusion is located between the two limiting blocks.

Preferably, an upper portion of the convex shaft is provided with an annular concave platform, and the driving member and the driven member are respectively nested on the annular concave platform.

Preferably, the gear box structure further includes a knob, wherein the knob is provided with an insertion shaft, and an outer surface of the insertion shaft is evenly distributed with a plurality of first positioning bumps, an inner surface of the driven member is evenly distributed with a plurality of second positioning bumps, the first positioning bumps are inserted between the two second positioning bumps.

Preferably, the driving member is a ring gear, and the driving device includes a first motor arranged on the box body, and a motor shaft of the first motor is provided with a worm, a first fixed shaft, a second fixed shaft and a third fixed shaft are disposed on the box body respectively, a worm gear meshed with the worm is sleeved on the first fixed shaft, and an upper portion of the worm gear is fixedly connected with a first gear, a second gear meshed with the first gear is sleeved on the second fixed shaft, and the lower portion of the second gear is fixedly connected with a third gear, a fourth gear meshed with the third gear is sleeved on the third fixed shaft, and an upper portion of the fourth gear is fixed with a fifth gear, and the fifth gear is meshed with the driving member.

Preferably, a driving device for driving the driving member is disposed in the box body, and driving member and the box body is provided with an inductive positioning assembly, and the inductive positioning assembly is in communication connection with the driving device.

Preferably, the inductive positioning assembly comprises three positioning holes are disposed on the box body and evenly distributed on a circle with the convex shaft as the center, and the induction elements are installed in the positioning holes, the driving member is provided with a positioning element, and the inductive element and the positioning element mutually induce to realize positioning triggering.

Preferably, the inductive element comprises a magnetic switch, and the positioning element comprises a magnetic needle. A mounting bump is disposed on the driving member, and an insertion hole is defined on the mounting bump, and the magnetic needle is inserted in the insertion hole.

Preferably, the inductive element comprises a photoelectric switch, and the positioning element comprises a photosensitive sheet.

Advantageous Effects of Disclosure

Advantageous Effects

The present disclosure has the advantages of simple and logical structure which can be conveniently assembled with good stability. Compared with the prior art, the production efficiency can be improved by assembling the reverse locking parts into the gear box. To assemble the components in different positions according to different lock bodies, and only a gear box needs to be assembled in advance, and then the gear box is assembled to the lock body.

Further, an inner bottom surface of the lower housing is provided with a convex shaft, a first shaft hole that penetrate vertically is disposed at an axis of the convex shaft, and a second shaft hole is disposed in an upper end surface of the upper housing and the second shaft hole is coaxial with the first shaft hole. A driving member and a driven member are sleeved with the convex shaft, wherein the driving member can drive the driven member to rotate around the convex shaft, and a limiting component is disposed between the driven member and the upper housing and is configured for limiting the rotation angle of the driven member. That is, by setting the driving member and the driven member on the convex shaft, it is not only easier to assemble, but also improves stability and prolongs service life compared with the traditional structure installed on the knob.

At the same time, in the present disclosure, a driving device for driving the driving member is disposed in the box.

An inductive positioning assembly is disposed on the driving member and the box body, and the inductive positioning assembly is in communication connection with the driving device, that is, when the drive component is driving the drive member for transmission to realize locking or unlocking, the movement orientation of the driving member can be sensed through the induction positioning component, so that the driving device can achieve better control.

OPTIMAL EMBODIMENT FOR IMPEMENTATING THE DISCLOSURE

Optimal Embodiment of Disclosure

The present disclosure will be further described below in conjunction with the drawings and embodiments.

Figure 1:
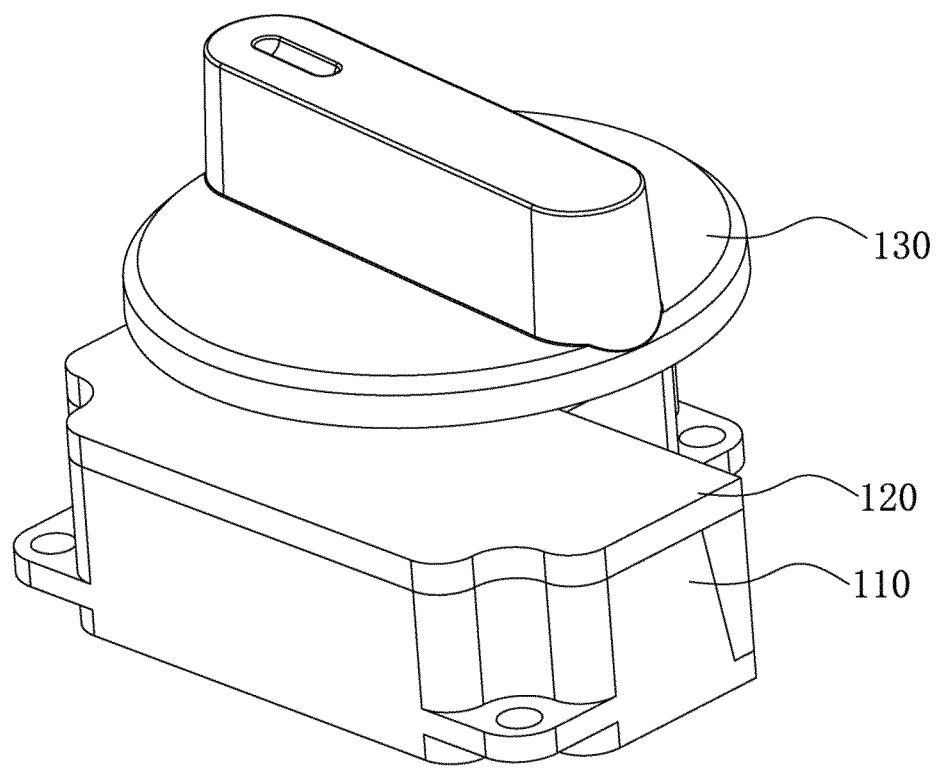
FIG. 1 is a first perspective view of a gear box structure of the present disclosure.
Figure 2:
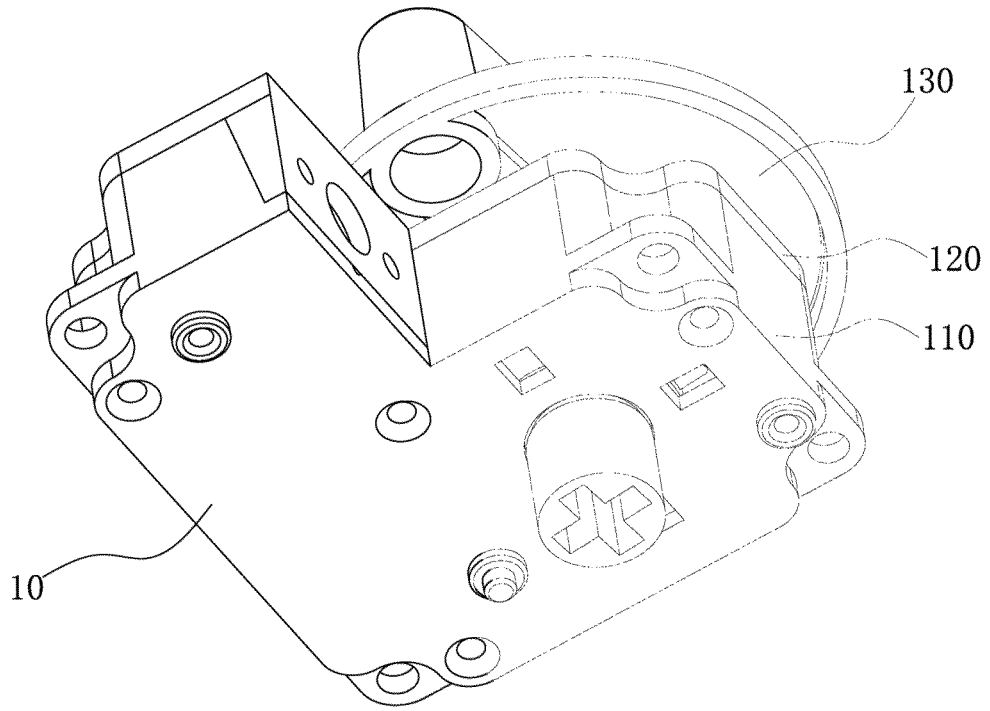
FIG. 2 is a second perspective view of the gear box structure of the present disclosure shown in FIG. 1.
Figure 3:
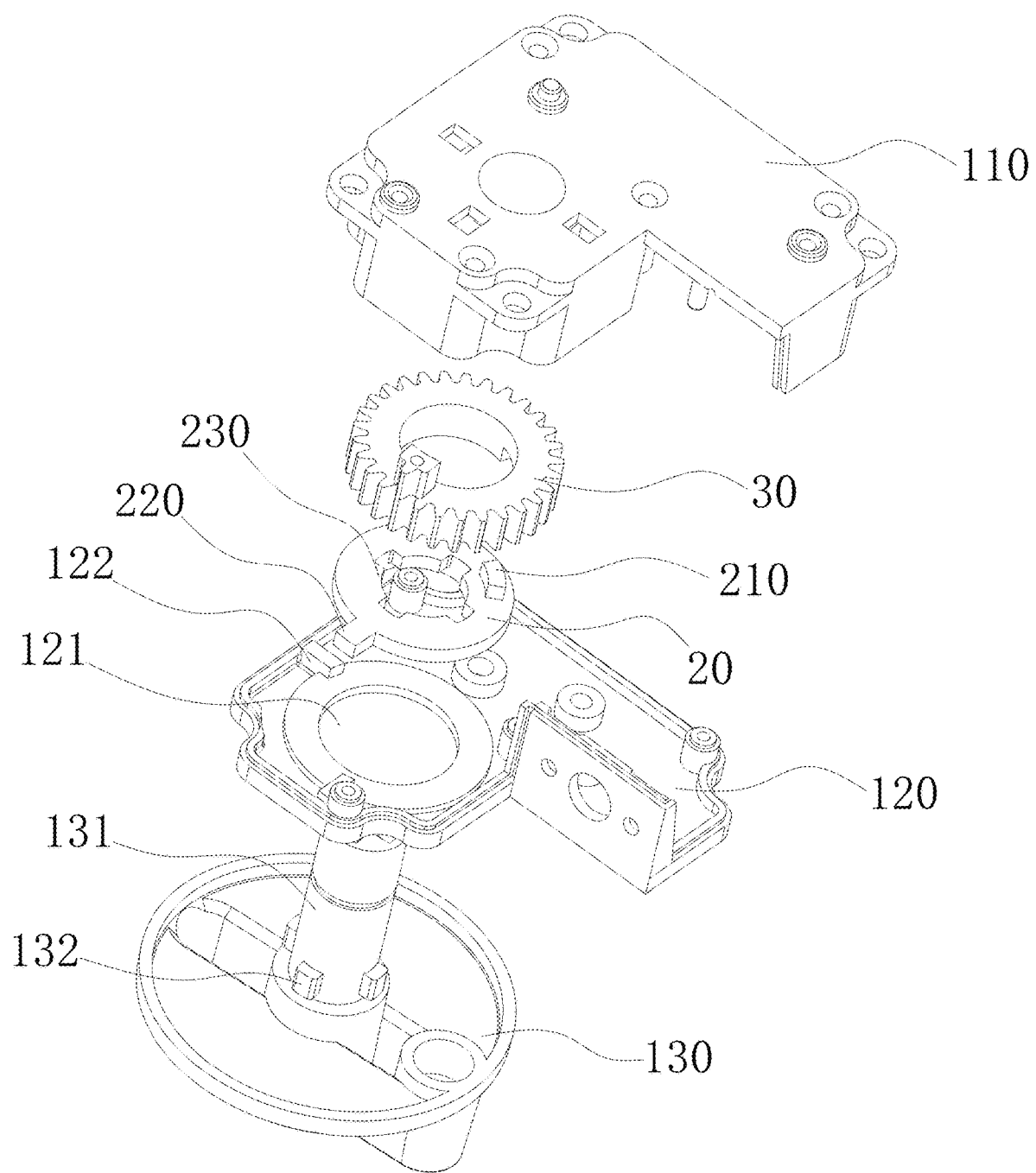
FIG. 3 is a first exploded view of the gear box structure of the present disclosure shown in FIG. 1.
Figure 4:
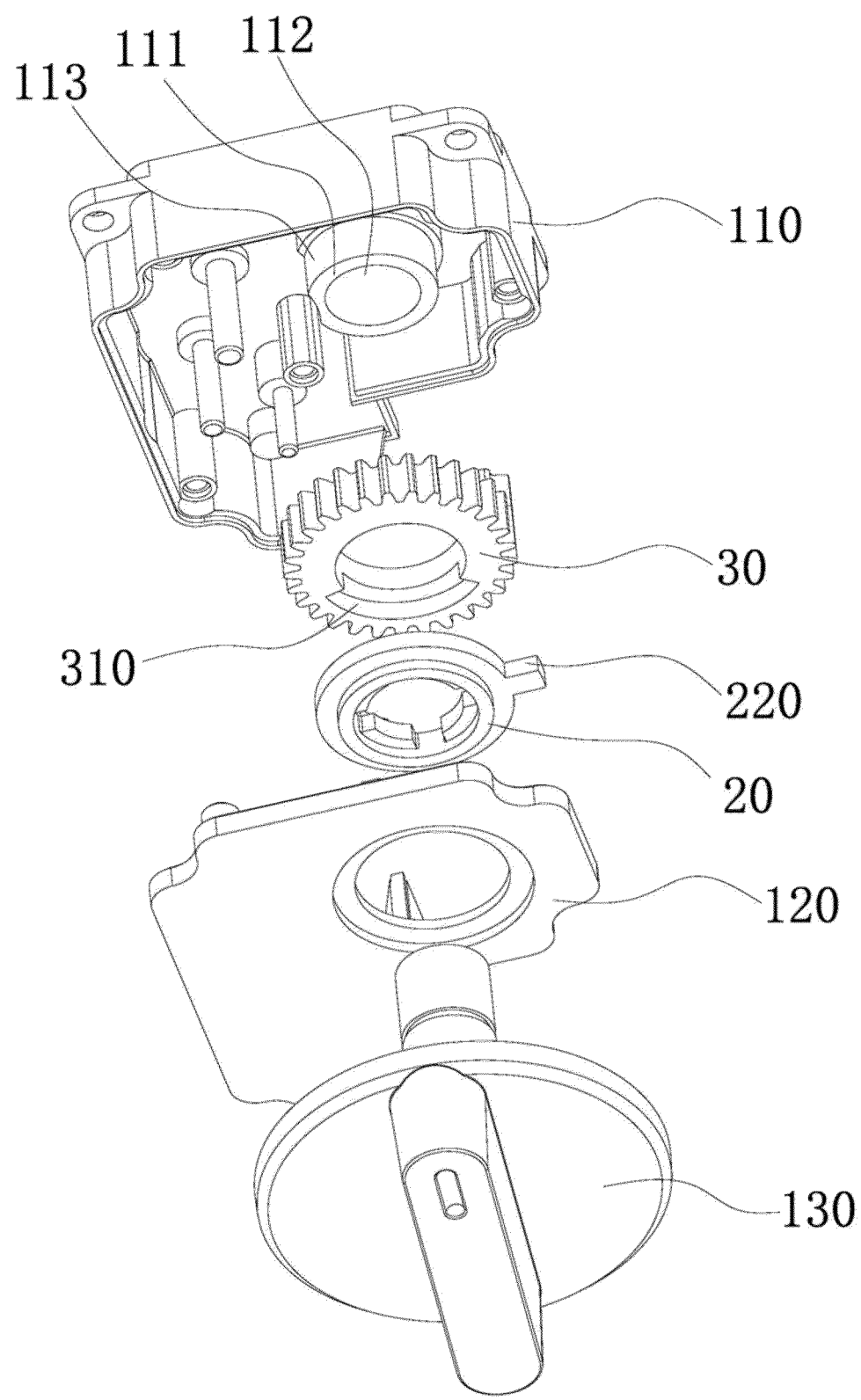
FIG. 4 is a second exploded of the gear box structure view of the present disclosure shown in FIG. 1.
Figure 5:
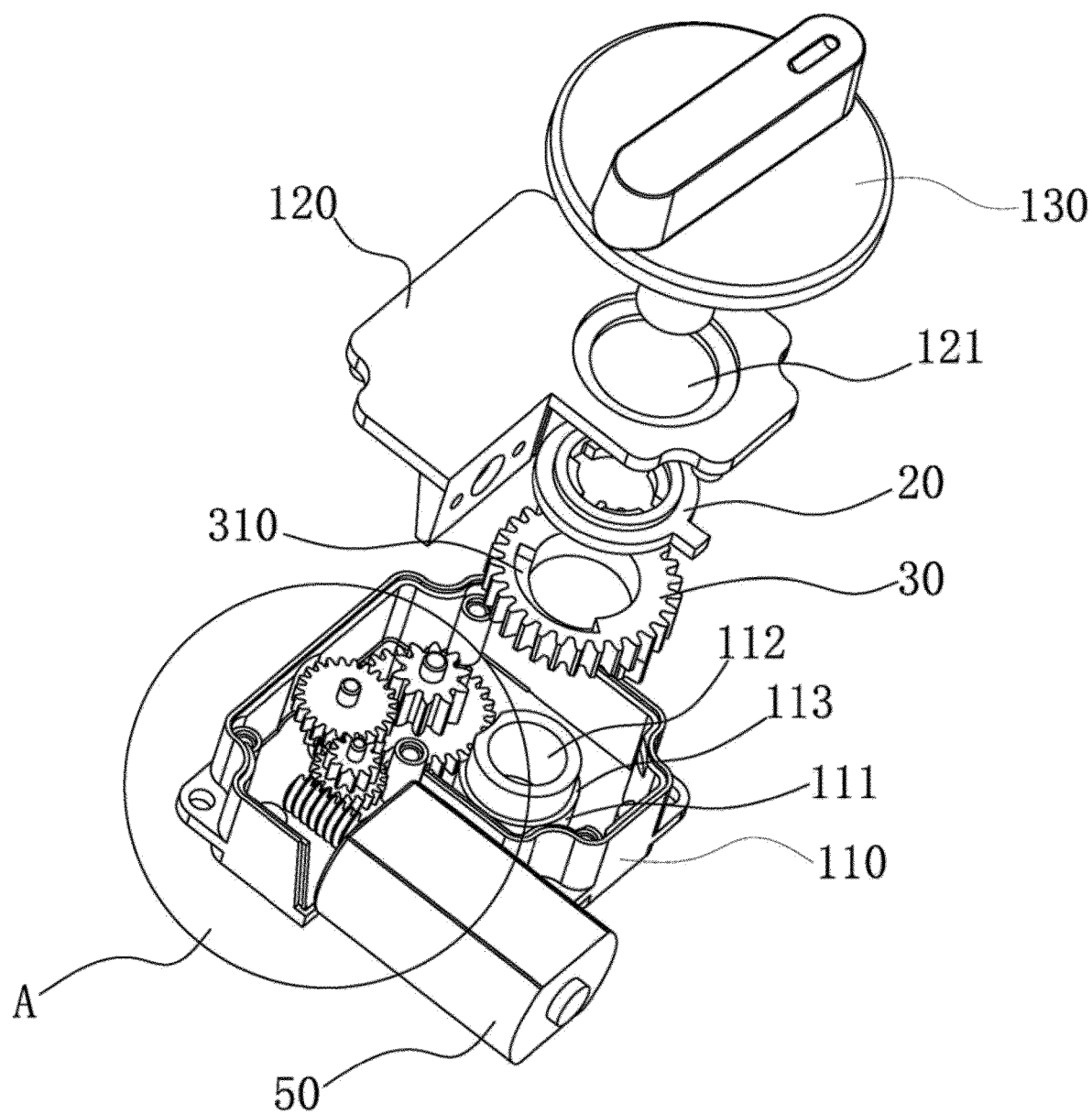
FIG. 5 is a third exploded of the gear box structure view of the present disclosure shown in FIG. 1.
Figure 6:
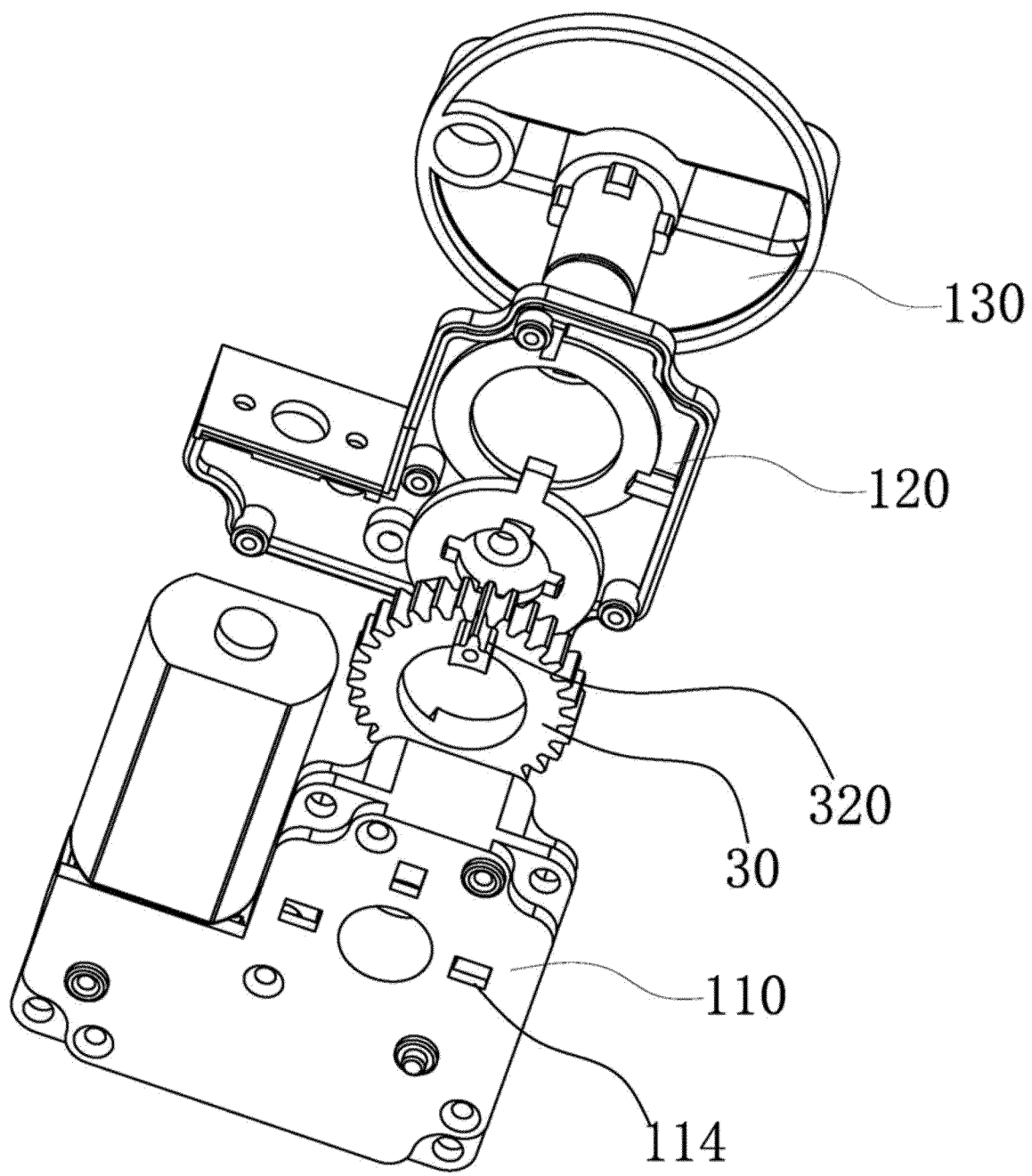
FIG. 6 is a fourth exploded view of the gear box structure of the present disclosure shown in FIG. 1.
Figure 7:
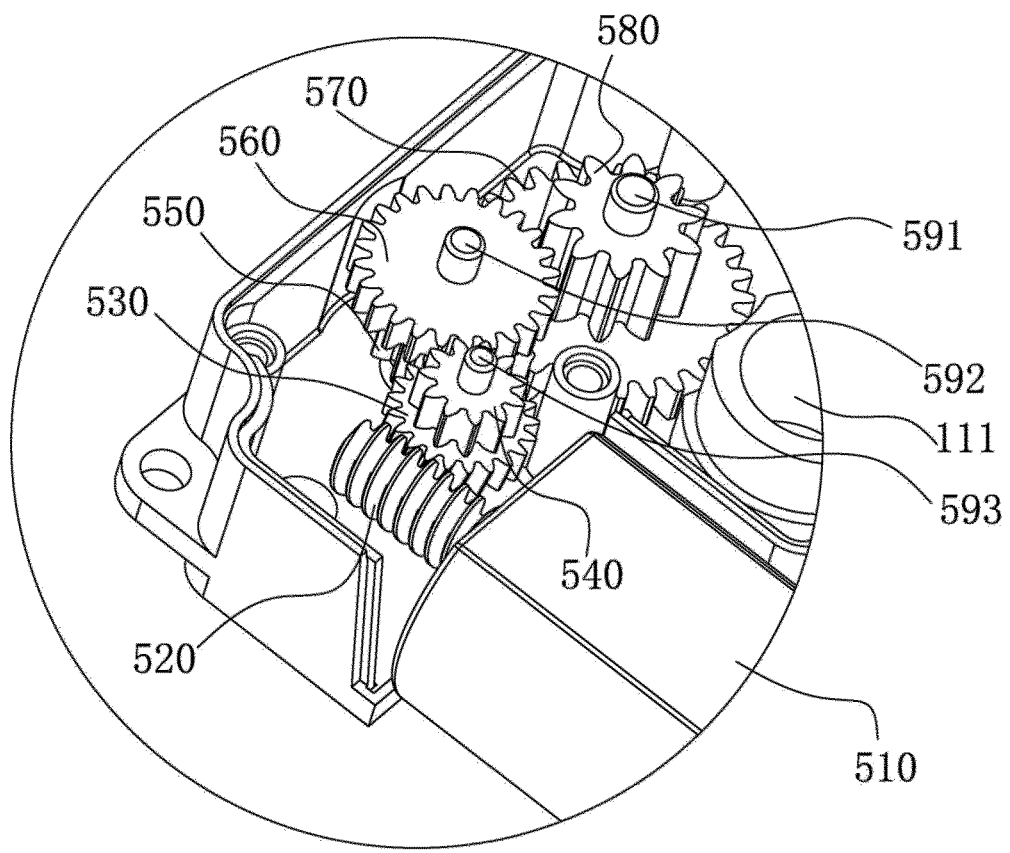
FIG. 7 is an enlarged view of a region A shown in FIG. 5 of the present disclosure.
Figure 8:
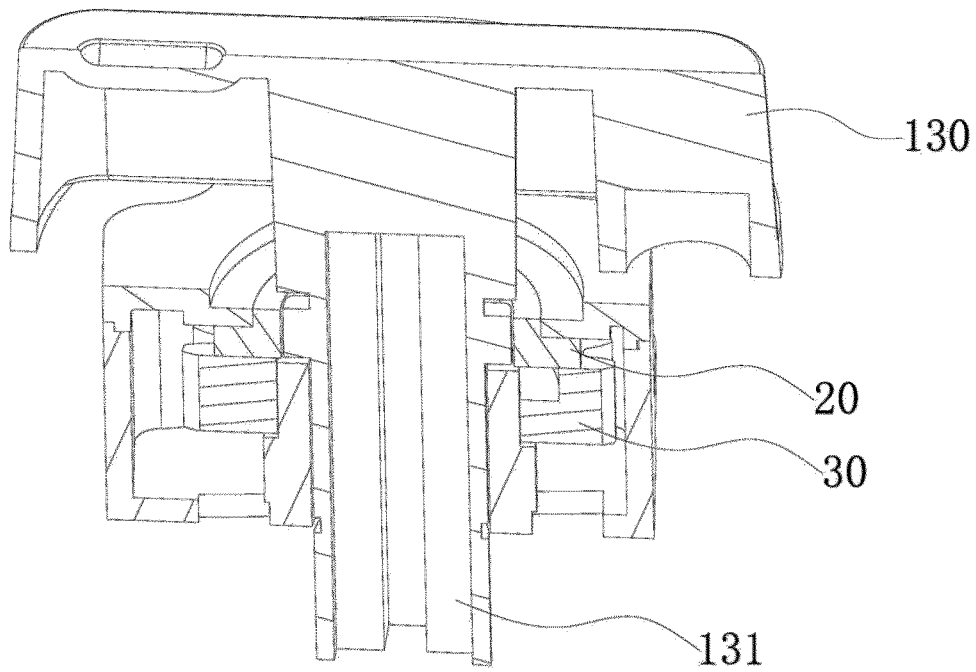
FIG. 8 is a first sectional view of the gear box structure of the present disclosure.
Figure 9:
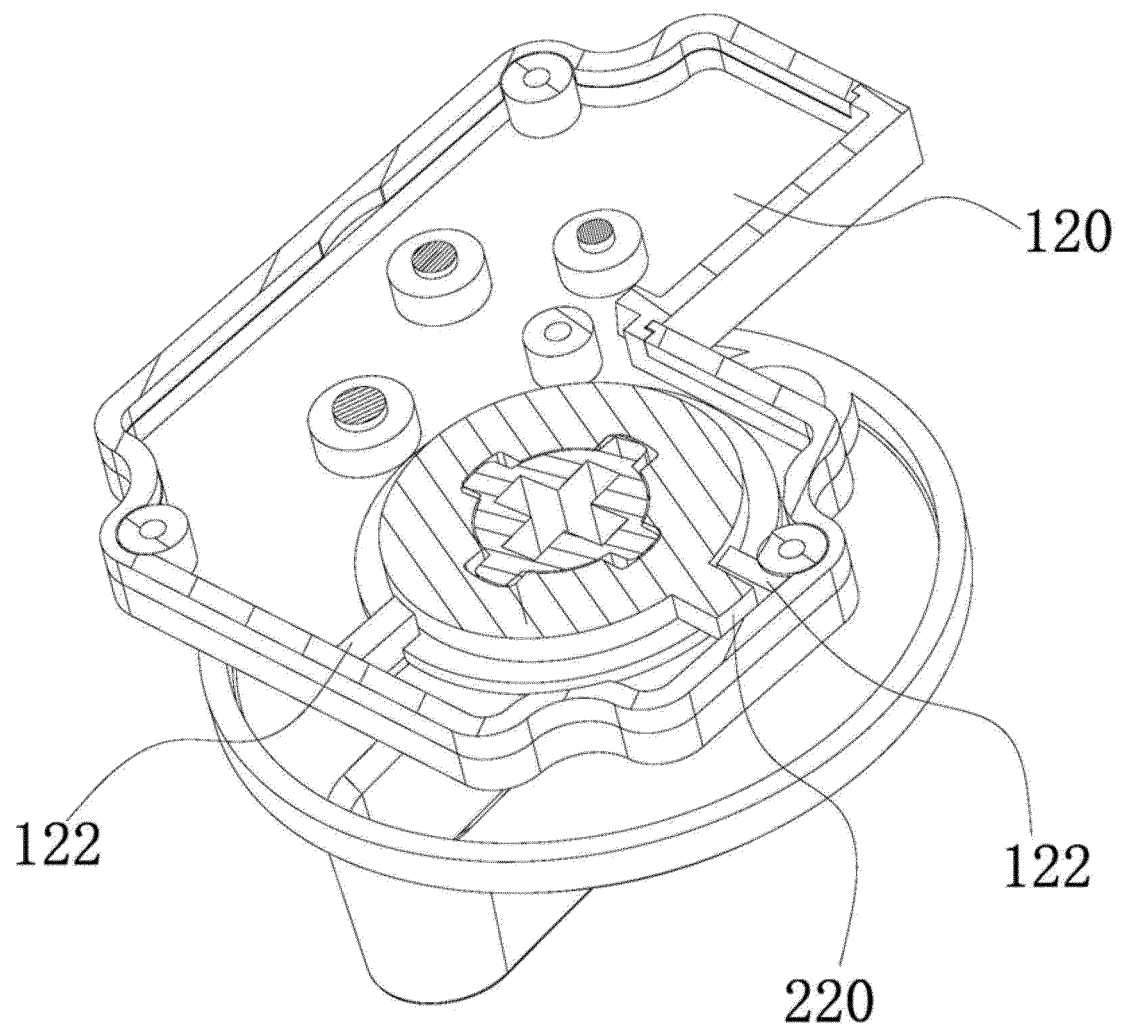
FIG. 9 is a second sectional view of the gear box structure of the present disclosure.

Referring to FIG. 1-FIG. 6, a gear box structure for driving is characterized in that it includes a box body 10 including an upper housing 120 and a lower housing 110, and an inner bottom surface of the lower housing 110 is provided with a convex shaft 111, a first shaft hole 112 penetrates vertically and is disposed at an axis of the convex shaft 111, and a second shaft hole 121 is disposed in an upper end surface of the upper housing 120 and the second shaft hole 121 is coaxial with the first shaft hole 112.

A driving member 30 and a driven member 20 are sleeved on the convex shaft 111, the driving member 30 can drive the driven member 20 to rotate around the convex shaft 111, and a limiting component is disposed between the driven member 20 and the upper housing 120, and the limiting component is configured for limiting a rotation angle of the driven member 20.

A driving device 50 for driving the driving member 30 is disposed in the box body 10.

An inductive positioning assembly is disposed on the driving member 30 and the box body 10 and is in communication connection with the driving device 50, which has the advantages of simple and logical structure for convenient assembly, and good stability. Compared with the prior art, the production efficiency can be improved by assembling the reverse locking components into the gear box. To assemble the components in different positions according to different lock bodies, and only a gear box needs to be assembled in advance, and then the gear box is assembled to the lock body.

That is, by sleeving the driving member and the driven member on the convex shaft, it is not only easier to assemble, but also improves stability and prolongs service life compared with the traditional structure installed on the knob.

At the same time, in the present disclosure, the box body is provided with the driving device for driving the driving member.

The driving member and the box body is provided with the inductive positioning assembly, and the inductive positioning assembly is in communication connection with the driving device. Meanwhile, when the driving assembly drives the driving member for transmission to realize locking or unlocking, the movement orientation of the driving member can be sensed through the induction positioning assembly, so as to facilitate better control of the drive device.

Specifically, an upper end surface of the driving member 30 is provided with an arc-shaped track groove 310, and a lower end surface of the driven member 20 is provided with a linkage block 210, and the linkage block 210 is downward and inserted into the arc-shaped track groove 310. That is, when the driving member rotates, when the linkage block is in contact with the two ends of the arc-shaped track groove, the driving member can drive the driven member to rotate by pushing the linkage block, which has a simple structure, convenient for driving, and suitable for use needed.

Further, two limiting blocks 122 are disposed on an inner top surface of the upper housing 120 with the center of the second shaft hole 121 as the axis, an outer surface of the driven member 20 is provided with a first protrusion 220, and the first protrusion 220 is located between the two limiting blocks 122.

That is, a rotation range of the driven member is equal to a spacing between the two limiting blocks.

The spacing between the limiting blocks 122 is set according to different usage requirements.

Further, an upper portion of the convex shaft 111 is provided with an annular concave platform 113, and the driving member 30 and the driven member 20 are respectively nested on the annular concave platform 113, which is convenient for assembly, good in stability, and suitable for use needed.

Further, the gear box structure further includes a knob 130, wherein the knob 130 is provided with an insertion shaft 131, and an outer surface of the insertion shaft 131 is evenly distributed with a plurality of first positioning bumps 132, an inner surface of the driven member 20 is evenly distributed with a plurality of second positioning bumps 230, the first positioning bumps 132 are inserted between the two second positioning bumps 230. That is, when the driven member rotates, the first positioning bump drives the second positioning bump, which drives the insertion shaft to drive the knob to rotate.

Specifically, the driving member 30 is a ring gear, and the driving device 50 includes a first motor 510 arranged on the box body, and a motor shaft of the first motor 510 is provided with a worm 520, a first fixed shaft 593, a second fixed shaft 592, and a third fixed shaft 591 are disposed on the box body 10 respectively, a worm gear 530 meshed with the worm 520 is sleeved on the first fixed shaft 593, and an upper portion of the worm gear 530 is fixedly connected with a first gear 540, a second gear 560 meshed with the first gear 540 is sleeved on the second fixed shaft 592, and the lower portion of the second gear 560 is fixedly connected with a third gear 550, a fourth gear 570 meshed with the third gear 550 is sleeved on the third fixed shaft 591, and an upper portion of the fourth gear 570 is fixed with a fifth gear 580, and the fifth gear 580 is meshed with the driving member 30.

The working principle is as follows: the first motor 510 drives the worm 520 to rotate, and the worm 520 can drive the worm gear 530 to rotate when rotating, that is, the worm gear 530 can drive the first gear 540 to drive the second gear 560 to rotate, and then the second gear 560 can drive the third gear 550 to drive the fourth gear 570 to rotate, and finally the fourth gear 570 drives the fifth gear 580 to drive the driving member 30 to rotate. Through the rotation of multiple gears, the stability of the transmission is ensured, the load of the motor is reduced, and the service life of the motor is extended. This is required for load use.

Specifically, the inductive positioning assembly comprises three positioning holes 114, the three positioning holes 114 are disposed on the box body 10 and evenly distributed on a circle with the convex shaft 111 as the center, and inductive elements are installed in the positioning holes 114, the driving member 30 is provided with a positioning element, and the inductive element and the positioning element mutually induce to realize positioning triggering. The inductive positioning assembly further comprises a control circuit board, the sensing element is connected to the control circuit board, and the control circuit board is connected to the first motor, that is, the inductive element sends a signal to the control circuit board, and the control circuit board controls the operation of the first motor according to the specific signal.

The inductive element comprises a magnetic control switch, the positioning element comprises a magnetic needle. A mounting bump 320 is disposed on the driving member 30, and an insertion hole is defined on the mounting bump 320, and the magnetic needle is inserted in the insertion hole.

The inductive element comprises a photoelectric switch, and the positioning element comprises a photosensitive sheet.

In the description of the present disclosure, it should be understanding that terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", etc. indicating orientations or positional relationships is based on the orientations or positional relationships shown in the drawings, and is only for the convenience of describing the present disclosure and simplifying the description, rather than indicating or implying that the referred device or element must have a specific orientation, be constructed and operated in a specific orientation. Therefore, it should not be interpreted as limiting the present disclosure, and the terms "first" and "second" are only used for descriptive purposes and should not be interpreted as indicating or implying relative importance or implicitly specifying the quantity of indicated technical features.

The basic principles and main features of the present disclosure and the advantages of the present disclosure have been shown and described above. Those skilled in the industry should understand that the present disclosure is not limited by the above-mentioned embodiments. What are described in the above-mentioned embodiments and the description only illustrate the principle of the present disclosure. Without deviating from the spirit and scope of the present disclosure, the present disclosure will also have variations and improvements are possible, which fall within the scope of the claimed disclosure. The protection scope of the present disclosure is defined by the appended claims and their equivalents.

What is claimed is:

1. A gear box structure for driving, comprising:
   a box body comprising an upper housing and a lower housing;
   a convex shaft provided on an inner bottom surface of the lower housing;
   a first shaft hole penetrating vertically and disposed at an axis of the convex shaft;
   a second shaft hole disposed on an upper end surface of the upper housing and the second shaft hole coaxial with the first shaft hole;
   a driving member; and
   a driven member, wherein each of the driving member and the driven member is sleeved on the convex shaft, the driving member is configured for driving the driven member to rotate around the convex shaft, and the driven member directly contacts an inner surface of a top wall of the upper housing,
   the gear box structure further comprising two limiting blocks disposed on the inner surface of the top wall of the upper housing at two locations located at a circumference centered around the second shaft hole,
   the driven member comprises a first protrusion protruding radially from a periphery of the driven member, wherein the first protrusion is rotatably disposed between the two limiting blocks, when the first protrusion is blocked by the limiting blocks, a rotation angle of the driven member is limited by the first protrusion.

2. The gear box structure for driving according to claim 1, wherein an arc-shaped track groove is disposed on an upper end surface of the driving member, and a linkage block is disposed on a lower end surface of the driven member, the linkage block extends downward towards the arc-shaped tracking groove and is insertable into the arc-shaped track groove.

3. The gear box structure for driving according to claim 1, further comprising an annular concave platform on an upper portion of the convex shaft, and the driving member and the driven member are respectively nested on the annular concave platform.

4. The gear box structure for driving according to claim 1, further comprising a knob; an insertion shaft in the knob; a plurality of first positioning bumps evenly distributed on an outer surface of the insertion shaft; and a plurality of second positioning bumps evenly distributed on an inner surface of the driven member, wherein the first positioning bumps is inserted between the two second positioning bumps.

5. The gear box structure for driving according to claim 1, wherein the driving member is a ring gear, and the driving device comprises a first motor arranged on the box body, a motor shaft; a worm on the motor shaft; a first fixed shaft; a second fixed shaft and a third fixed shaft, each of the first fixed shaft, the second fixed shaft and the third fixed shaft is disposed on the box body respectively;
   a worm gear meshed with the worm is sleeved on the first fixed shaft and an upper portion of the worm gear is fixedly connected with a first gear, a second gear meshed with the first gear is sleeved on the second fixed shaft, and a lower portion of the second gear is fixedly connected with a third gear, a fourth gear meshed with the third gear is sleeved on the third fixed shaft, and an upper portion of the fourth gear is fixed with a fifth gear, and the fifth gear is meshed with the driving member.

6. The gear box structure for driving according to claim 1, further comprising a driving device; and an inductive positioning assembly disposed on the driving member and the box body, wherein the driving device is configured for driving the driving member, the driving device is disposed in the box body, and the inductive positioning assembly is in communitive connection with the driving device.

7. The gear box structure for driving according to claim 6, wherein the inductive positioning assembly comprises three positioning holes, the three positioning holes are disposed on the box body and evenly distributed on a circle with the convex shaft as a center of the circle, and inductive elements are installed in the positioning holes, the driving member comprises a positioning element, the inductive element and the positioning element mutually induce to realize positioning and triggering.

8. The gear box structure for driving according to claim 7, wherein the inductive element comprises a magnetic control switch, the positioning element comprises a magnetic needle, a mounting bump is disposed on the driving member, an insertion hole is defined on the mounting bump, and the magnetic needle is inserted in the insertion hole.

9. The gear box structure for driving according to claim 7, wherein the inductive element comprises a photoelectric switch, and the positioning element comprises a photosensitive sheet.

10. The gear box structure for driving according to claim 1, wherein the inner surface of the top wall of the upper housing, along a periphery of the second shaft hole, comprises a flange, and the driven member is rotatably disposed on the flange.

11. The gear box structure for driving according to claim 10, wherein the upper housing comprises a first sidewall and a second sidewall along a periphery of the upper housing, one of the two limiting blocks extends along a first direction from the first sidewall toward the flange, and another one of the two limiting blocks extends along a second direction from the second sidewall toward the flange, the second direction is substantially perpendicular to the first direction.

12. The gear box structure for driving according to claim 10, wherein each of the two limiting blocks comprises a first portion directly located on the inner surface of the top wall of the upper housing; and a second portion positioned on the flange.

13. The gear box structure for driving according to claim 1, wherein the first protrusion is integrally formed with the driven member.

14. The gear box structure for driving according to claim 1, further comprising a knob comprising an insertion shaft configured to extend through the upper housing, the driven member, and the driving member, wherein a front end of the insertion shaft is inserted into the first shaft hole of the convex shaft.

* * * * *